US011438948B1

(12) United States Patent
Oroskar et al.

(10) Patent No.: US 11,438,948 B1
(45) Date of Patent: Sep. 6, 2022

(54) CONTROLLING LEVEL OF CARRIER AGGREGATION BASED ON MIMO-LAYER SUPPORT (71) Applicant: Sprint Spectrum L.P., Overland Park, KS (US)

(72) Inventors: Siddharth S. Oroskar, Overland Park, KS (US); Jasinder P. Singh, Olathe, KS (US); Ravi Kallepalli, Overland Park, KS (US); Ryan P. Dreiling, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 455 days.

(21) Appl. No.: 16/174,508

(22) Filed: Oct. 30, 2018

(51) Int. Cl.
*H04W 76/15* (2018.01)
*H04B 7/0413* (2017.01)

(52) U.S. Cl.
CPC .......... *H04W 76/15* (2018.02); *H04B 7/0413* (2013.01)

(58) Field of Classification Search
CPC .... H04B 7/0486; H04B 7/0413; H04B 7/063; H04B 7/06; H04B 7/024; H04B 7/0452; H04B 7/0473; H04B 7/066; H04L 5/001; H04L 1/0026; H04L 5/0053; H04L 1/1861; H04L 1/003; H04L 2209/122; H04L 25/03955; H04L 5/0058; H04L 9/3271; H04L 25/03929; H04W 72/042; H04W 76/14; H04W 72/0413; H04J 11/0023; H04J 1/00

See application file for complete search history.

(56) References Cited

U.S. PATENT DOCUMENTS

| 9,660,706 B1 | 5/2017 | Oroskar et al. | |
| 2011/0310986 A1* | 12/2011 | Heo | H04L 5/0055 375/259 |
| 2013/0028149 A1* | 1/2013 | Chen | H04L 5/0005 370/280 |
| 2017/0353222 A1* | 12/2017 | Wei | H04B 7/0486 |
| 2018/0139750 A1* | 5/2018 | Takahashi | H04B 7/06 |
| 2019/0140717 A1* | 5/2019 | Suzuki | H04L 5/0053 |

* cited by examiner

*Primary Examiner* — Yemane Mesfin
*Assistant Examiner* — Mon Cheri S Davenport (57) ABSTRACT

A method and system for controlling how many carriers to aggregate together for carrier-aggregation service of a UE. A base station could take into account how many MIMO layers a UE would support respectively for each of various candidate quantities of carriers, and the base station could select the candidate quantity of carriers that would result in use of a highest aggregate total number of MIMO layers. Further, the selection could involve mapping UE-reported rank to a quantity of carriers, with the rank being inversely proportional to the selected quantity of carriers. The base station could then configure carrier-aggregation service of the UE with the selected quantity of carriers.

20 Claims, 4 Drawing Sheets

CONTROLLING LEVEL OF CARRIER AGGREGATION BASED ON MIMO-LAYER SUPPORT

BACKGROUND

In a wireless communication system, a base station provides one or more coverage areas, such as cells or sectors, in which the base station can serve user equipment devices (UEs), such as cell phones, wirelessly-equipped personal computers or tablets, tracking devices, embedded wireless communication modules, or other devices equipped with wireless communication functionality, whether or not user operated.

In general, each coverage area could operate on one or more carriers each defining one or more ranges of frequency spectrum and having a respective downlink channel for carrying communications from the base station to UEs and a respective uplink channel for carrying communications from the UEs to the base station. Such carriers could be frequency division duplex (FDD), in which the downlink and uplink channels are defined as separate respective ranges of frequency, or time division duplex (TDD), in which the downlink and uplink channels are defined on a common range of frequency but are distinguished through time division multiplexing. Further, the downlink channel and uplink channel of each carrier could also be divided into respective sub-channels for carrying particular communications, such as one or more control channels for carrying control signaling and one or more traffic channels for carrying application-layer data and other traffic.

In an example system, for instance, the air interface could be divided over time into frames and subframes each defining a number of slots, and the uplink and downlink channels could each be divided over their frequency bandwidth into subcarriers that are grouped within each slot into resource blocks for carrying bearer traffic, and with portions of each subframe further defining various control channels for signaling communication between the base station and UEs.

OVERVIEW

When a UE is positioned within coverage of a base station, the UE may attach with the base station on a particular carrier on which the base station is configured to provide service, and the base station could then schedule particular downlink and uplink resource blocks on that carrier to carry data communications to and from the UE. Further, the base station and UE could modulate their air interface data communications at a coding rate selected based on quality of the UE's coverage, such as with higher rate coding rate when the UE is in better coverage of the base station and with a lower coding rate when the UE is in worse coverage of the base station.

In the example system noted above, for instance, when the base station has data to transmit to a UE, the base station could assign certain downlink resource blocks (and thus certain subcarriers) in a given subframe for use to carry the data to the UE at a particular modulation and coding scheme (MCS) selected based on the UE's coverage quality, and the base station could then (i) transmit to the UE in that subframe a downlink control information (DCI) message that specifies the assigned resource blocks and MCS and (ii) encode and transmit the data to the UE in the assigned resource blocks in that subframe. Per the DCI message, the UE could then read the transmitted data from the assigned resource blocks.

Likewise, when the UE has data to transmit to the base station and transmits a scheduling request to the base station, the base station could responsively assign certain uplink resource blocks in a given subframe for use to carry the data from the UE using a particular MCS selected based on the UE's coverage quality and could transmit to the UE, in advance of that subframe, a DCI message that specifies the assigned resource blocks and MCS. And the UE could then encode and transmit the data to the base station in the assigned resource blocks.

In practice, a base station could serve a UE on a single carrier, such as the carrier on which the UE attaches with the base station, in which case the base station may allocate resources on that carrier for use to carry communications to and from the UE.

Alternatively, the base station could serve the UE on multiple carriers at once, providing "carrier aggregation" service. With carrier-aggregation service, the base station would serve the UE concurrently on multiple carriers from either contiguous frequency bands or non-contiguous frequency bands. And when faced with a need to schedule data communication to or from the UE in a given subframe, the base station could then distribute the data communication concurrently among the multiple carriers, allocating resources on each carrier respectively to carry some of the data. Serving the UE concurrently on multiple carriers could facilitate increased peak data rates and may provide other provide benefits as well.

Carrier-aggregation service could be characterized by the number of carriers on which the base station serves the UE. For instance, carrier-aggregation service on 2 carriers could be referred to as 2CA, and carrier-aggregation service on 3 carriers could be referred to as 3CA.

In addition, a base station and UE could be configured to engage in air interface communication with each other using multiple-input multiple-output (MIMO) technology with spatial multiplexing. MIMO provides for air interface communication concurrently on multiple different radio-frequency propagation paths, from multiple transmit-antennas at the transmitting end (e.g., at the base station or UE) to multiple receive-antennas at the receiving end (e.g., at the UE or the base station). With spatial multiplexing, when the transmitting end has data to transmit to the receiving end, the data is multiplexed (e.g., time division multiplexed) onto multiple antenna output ports and thus onto multiple radio frequency (RF) propagation paths, so that a separate portion of the data is transmitted respectively on each propagation path. In this arrangement, each propagation path is considered to be a MIMO "layer". Serving a UE concurrently on multiple MIMO layers could also facilitate increased peak data rates and provide other benefits.

MIMO communication service could be characterized by how many transmit antennas (or transmit antenna groups), T, are used and how many receive antennas (or receive antenna groups), R, are used, as T×R MIMO service. Further, if T and R are equal, then the number of MIMO layers could be considered equal to T and R, whereas if T and R are different, then the number of MIMO layers could be considered the lesser of the two. Thus, MIMO service with two transmit antennas and two receive antennas (2×2 MIMO) could be considered to have two layers, MIMO service with four transmit antennas and four receive antennas (4×4 MIMO) could be considered to have four layers, and MIMO service with two transmit antennas and one receive antenna (2×1 MIMO) or with just one transmit antenna and one receive antenna (1×1 MIMO—still MIMO, but effectively single-input single-output (SISO)) could be considered to have just one layer. Other examples and characterizations of MIMO modes and MIMO layers are possible as well, within the understanding of those of ordinary skill in the art.

When a base station serves a UE, the base station could determine based on control signaling from the UE how many MIMO layers to configure for communication with the UE. For instance, the UE could periodically evaluate the quality or performance of its air interface with the base station (e.g., signal-to-interference-plus-noise ratio (SINR), carrier-to-interference-plus-noise ratio (CINR), and/or frame error rate (FER)). And based on that evaluation and/or other analysis, the UE could establish a MIMO rank (or rank index (RI)—e.g., a MIMO matrix rank) that maps to a maximum quantity of MIMO layers that the air interface might support.

In a representative implementation, a lower rank could map to a lower maximum quantity of MIMO layers that the air interface might support, and a higher rank could map to a higher maximum quantity of MIMO layers. Thus, based on the UE's reported rank, the base station select quantity of MIMO layers and could configure its communication with the UE accordingly.

The quantity of MIMO layers on which a base station serves a UE could be a quantity of MIMO layers per carrier on which the base station serves the UE, as communication between the base station and the UE could use that quantity of MIMO layers on each carrier on which the base station serves the UE. As such, communication between the base station and the UE could be considered to have an aggregate total number of MIMO layers equal to the number of carriers on which the base station serves the UE times the per-carrier number of MIMO layers. For instance, if the base station serves the UE with 3CA using 2 MIMO layers, then the communication between the base station and the UE could be considered to have an aggregate total of 3×2=6 MIMO layers.

Although a UE's reported rank may map to use of a particular quantity of MIMO layers for communication between the base station and the UE, there may also be a limit on the per-carrier number of MIMO layers that could be used for communication with a UE depending on the quantity of carriers on which the base station serves the UE. For instance, a representative class of UEs might support up to 2 MIMO layers when served with 3CA, but might support up to 4 MIMO layers when served with 2CA. These limitations could be specified by UE-capabilities data, and the base station could restrict MIMO configuration accordingly.

In practice, a base station serving such a UE might try to maximize the level of carrier-aggregation service that it provides for the UE, to help maximize the peak data rate. For instance, given a choice between serving the UE with 2CA or serving the UE with 3CA, the base station might opt to serve the UE with 3CA, as 3CA could support a higher peak data rate than 2CA.

Unfortunately, however, serving a UE with a higher level of carrier aggregation might result in use of a lower aggregate total of MIMO layers than would otherwise be possible. Considering the representative class of UEs noted above, for instance, if a base station opts to serve a UE with 3CA rather than 2CA, then communication between the base station and the UE would be limited to 2 MIMO layers per carrier, which would provide an aggregate total of 3×2=6 MIMO layers. Whereas, if the base station were to serve that UE with 2CA rather than 3CA, then the communication between the base station and the UE could use 4 MIMO layers per carrier, which would provide an aggregate total of 2×4=8 MIMO layers.

In situations like this, it may therefore be better for the base station to serve the UE with a lower level of carrier aggregation in order to help maximize the aggregate total number of MIMO layers used for communication between the base station and the UE. More particularly, assuming that the UE could support various levels of per-carrier MIMO, it could be beneficial for the base station to serve the UE on a quantity of carriers that will result in use of the highest possible aggregate total number of MIMO layers for communication between the base station and the UE.

On the other hand, the UE at issue might face a practical limit on the per-carrier number of MIMO layers that its communication with the base station may support, with the limit being based on the UE's reported rank. As indicated above, if the UE's reported rank is low, the UE's communication with the base station might support a lower maximum quantity of MIMO layers, and if the UE's reported rank is high, the UE's communication with the base station might support a higher maximum quantity of MIMO layers.

Given this, for certain UEs such as those in the representative class discussed above, it may not be useful to serve a UE with the lower quantity of carriers if the UE has reported a low rank, since the UE may not be able to make use of the higher associated per-carrier quantity of MIMO layers that comes with the lower quantity of carriers. Therefore, it may follow that when a UE has a low reported rank, then it may be better to serve the UE with a greater quantity of carriers that would have a lower associated per-carrier quantity of MIMO layers. And if the UE has a high reported rank, then it may be better to serve the UE with a lower quantity of carriers that would have a higher associated per-carrier quantity of MIMO layers. That is, the decision of how many carriers to aggregate for carrier-aggregation service of the UE could be made based on the UE's reported rank, perhaps with a mapping that makes the quantity of carriers inversely proportional to the UE's reported rank.

For instance, if such a UE reports a low rank, then the UE might be limited to no more than 2 MIMO layers per carrier. In that situation, the low rank could map to a high number of carriers. In particular, given a choice between 2CA and 3CA, the base station could advantageously serve the UE with 3CA and with the 2 MIMO layers per carrier, providing an aggregate total of 3×2=6 MIMO layers, rather than serving the UE with 2CA and 2 MIMO layers, which would provide an aggregate total of just 2×2=4 MIMO layers. Whereas, if the UE reports a high rank, then the UE might support 4 MIMO layers per carrier. In that situation, the low rank could map to a high number of carriers. In particular, the base station could advantageously serve the UE with 2CA and 4 MIMO layers per carrier, to provide aggregate total of 2×4=8 MIMO layers.

Accordingly, disclosed herein is a method and system for controlling how many carriers a base station should aggregate together for carrier-aggregation service of a UE. In accordance with the disclosure, the base station could select the quantity of carriers based on the rank reported by the UE, such as based on a mapping that makes the selected quantity of carriers inversely proportional to the reported rank. Further or alternatively, the base station could select the quantity of carriers based on what aggregate total number of MIMO layers the communication between the base station and UE would use, as a product of the selected quantity of carriers and the per-carrier maximum quantity of MIMO layers that the UE supports for the selected quantity of carriers. The base station could then configure carrier-aggregation service of the UE with the selected quantity of carriers.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Referring to the drawings, as noted above, FIG. 1 is a simplified block diagram of an example wireless communication system in which disclosed features can be implemented. It will be understood, however, that numerous variations from the details disclosed in this figure and elsewhere herein are possible. For instance, elements, arrangements, and functions may be added, removed, combined, distributed, reordered, or otherwise modified. In addition, it will be understood that functions described here as being performed by one or more entities may be implemented in various ways, such as by a processor executing software instructions for instance.

Figure 1:
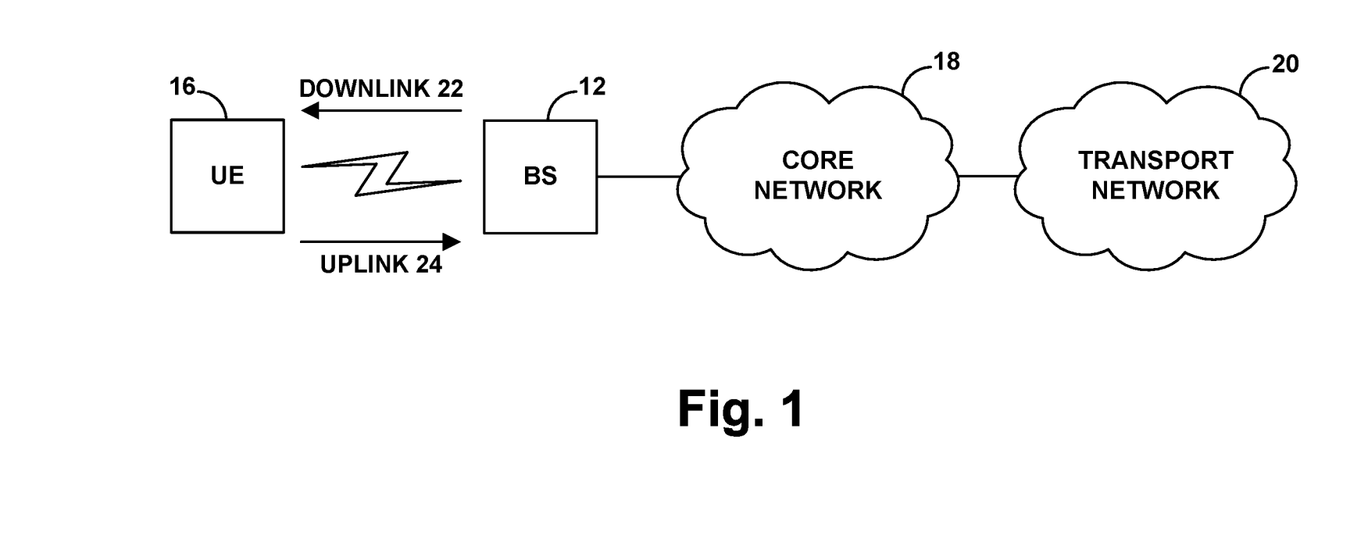
FIG. 1 is a simplified block diagram of a wireless communication system in which disclosed features can be implemented.

The example system of FIG. 1 includes a representative network that may function primarily to serve UEs with wireless packet data communication service, including possibly voice-over-packet service, but may also provide other functions.

As shown, the network includes a base station 12, which has an antenna structure and associated equipment for providing coverage 14 in which to serve UEs such as an example UE 16 as shown. The base station 12 then sits as a node on a core access network 18, which provides connectivity with one or more transport networks 20 such as the Internet for instance. In practice the core network 16 could include a gateway or set of gateways with which the base station is configured to communicate and that provide the transport-network connectivity. Further, the core network could include one or more control nodes that operate to control setup of bearers to carry UE communications between the base station and the gateway(s), so as to enable served UEs to engage in data communication on the transport network(s).

As illustrated, the air interface of coverage 14 defines a downlink direction 22 from the base station to the UE and an uplink direction 24 from the UE to the base station. Further, the base station and UE may be configured (e.g., licensed and programmed) to support air interface communication on various carriers, which may be FDD or TDD. Each such carrier and/or its particular downlink and uplink channels could be defined as being centered at a particular frequency and spanning a particular bandwidth (such as 1.4 MHz, 3 MHz, 5 MHz, 10 MHz, 15 MHz, or 20 MHz, among other possibilities), and each carrier could be identified by a respective globally unique identifier per industry standard, so that the base station and UE can refer to the carrier by that identifier.

As noted above, each carrier could further be structured to define various sub-channels for carrying control and traffic communication. Under an example protocol, for instance, each carrier's downlink channel could define a downlink control channel for carrying scheduling directives and other control signaling from the base station to UEs, a downlink shared channel divided into resource blocks as noted above for carrying scheduled downlink data communication, and a reference channel for carrying a reference signal that UEs can monitor to evaluate coverage quality. Likewise, each carrier's uplink channel could define an uplink control channel for carrying scheduling requests and other control signaling from the UEs to the base station and an uplink shared channel divided into resource blocks as noted above for carrying scheduled uplink data communication.

With this arrangement, when UE 16 enters into coverage of base station 12, the UE could detect the base station's coverage on a particular carrier, and the UE could then connect with the base station on that carrier. For instance, the UE and base station could engage in random access signaling and Radio Resource Control (RRC) signaling on the carrier to establish an RRC connection encompassing the carrier. Further, the base station could establish a context record for the UE, indicating service state and parameters for serving the UE, such as an identification of the carrier on which the base station is serving the UE. And the UE could likewise establish a context record indicating service state and parameters for being served, such as the carrier on which it is being served.

Once the UE is connected with the base station, the UE could then engage in an attachment process to register for service with the network. For instance, the UE could transmit via its RRC connection to the base station an attach request message, which the base station could forward to a network control node. And the network control node could then authenticate the UE and could coordinate setup of a bearer to facilitate UE data communication. Further, the base station and UE could accordingly update their context records to indicate the established bearer.

Separately or as part of the attachment process, the base station could also determine capabilities of the UE, such as service features that the UE supports, and could store that capabilities data in its context record for the UE. The base station could receive this capabilities data from the network control node or from the UE, or could determine the UE's capabilities in another manner. Further, the capabilities data could be based on subscription class, make/model, and/or one or more other attributes of the UE.

Among other information, the determined UE capabilities data could indicate (i) which levels of carrier aggregation the UE supports, such as the maximum level of carrier aggregation that the UE supports and (ii) for each of possibly multiple levels of carrier aggregation, the maximum number of MIMO layers that the UE supports per carrier. Without limitation and as discussed above, for instance, the UE's capability data could indicate that the UE supports up to 3CA and that (a) for 2CA, the UE supports up to 4 MIMO layers per carrier and (b) for 3CA, the UE supports up to 2 MIMO layers per carrier. The UE's capability data could specify these or other values in a "SupportedbandCombination" field or in another manner.

Once the UE is connected and registered for service, the base station could then coordinate data communication to and from the UE. In particular, as discussed above, the base station could allocate downlink resource blocks for carrying data to the UE, and the base station could transmit to the UE a DCI message designating those resource blocks and could transmit the data to the UE on those resource blocks. And likewise, the base station could allocate uplink resource blocks for carrying data from the UE, the base station could transmit to the UE a DCI message designating those resource blocks, and the UE could transmit data to the base station on those resource blocks.

In practice, the base station could serve numerous UEs concurrently on the carrier. Given the limited bandwidth of the carrier in each subframe, the base station could therefore apply a scheduling process to allocate resources of the carrier as appropriate among its served UEs. Further, the base station and the UEs could buffer data as necessary while awaiting scheduled transmission.

At the time of attachment or otherwise while serving the UE, the base station could also reconfigure service of the UE to be on a different number of carriers. For instance, once the UE has attached on a single carrier, the base station could add one or more carriers to the UE's service so as to then provide the UE with carrier-aggregation service. Further, when the base station is serving the UE on multiple carriers, the base station could add one more additional carriers, swap carriers, or remove one or more carriers, possibly reverting to serving the UE on just a single carrier. To so reconfigure the UE's service, the base station could generate and transit to the UE an RRC connection reconfiguration message identifying the carrier(s) on which the base station will serve the UE, and the base station and UE could update their context records accordingly, so that they would be prepared to communicate with each other on the identified carrier(s).

When the base station thereby provides the UE with carrier-aggregation service, the base station could similarly coordinate data communication to and from the UE, but the communication could occur on the multiple carriers concurrently. When the base station has data for transmission to the UE, the base station could schedule transmission of the data distributed concurrently across downlink resource blocks on the multiple carriers, and the base station could transmit to the UE a DCI message specifying the allocated resource blocks respectively on each carrier and could transmit the data to the UE accordingly. And likewise, when the UE has data to transmit, the base station could schedule that transmission to be distributed concurrently across uplink resource blocks on the multiple carriers, the base station could transmit to the UE a DCI message specifying the allocated resource blocks respectively on each carrier, and the UE could transmit the data to the base station accordingly.

As further noted above, the base station and the UE could also support MIMO communication defining possibly multiple concurrent layers of data communication distinguished with spatial multiplexing. To facilitate this, the base station and the UE could each be equipped with multiple separate antennas (or antenna systems, arrays, groups, or the like) arranged or configurable to engage in RF communication on separate respective propagation paths, in a well-known manner.

The number of MIMO layers supported by the base station and UE could depend on their respective antenna configurations and supported MIMO capabilities. Further, as noted above, the UE could periodically report to the base station a MIMO rank, which the base station could map to an associated quantity of supported MIMO layers.

When the base station schedules data communication to or from a UE on allocated air interface resources, whether on a single carrier or on multiple carriers, the base station could configure MIMO communication of the data. To do so, the base station could include in its DCI message to the UE an indication of the quantity of MIMO layers, such as by including in a precoding field of the DCI message a bit pattern that maps to the number of layers to be used. With a MIMO configuration where T=R, the number of layers as so specified could be a number that equals T and R, so that a specification of 2 layers could represent 2×2 MIMO, a specification of 4 layers could represent 4×4 MIMO, and a specification of 8 layers could represent 8×8 MIMO, and so forth. Further, more particular indications could be provided for other MIMO configurations, such as to indicate a MIMO configuration where T and R differ from each other.

With some variation possible, all of the multiple MIMO layers could share the allocated air interface resources. For instance, if the base station allocates ten resource blocks on a carrier and designates two-layer MIMO communication, two separate MIMO layers of data could be transmitted concurrently on the resources of those ten resource blocks, optimally with the two layers being differentiated from each other by their spatial multiplexing. Likewise, if the base station allocates ten resource blocks on one carrier concurrently with five resource blocks on another carrier, for a total of fifteen resource blocks, and the base station designates two-layer MIMO communication, two discrete MIMO layers of data could be transmitted concurrently on the resources of those fifteen resource blocks, again optimally with the layers being differentiated from each other by at least their spatially separate RF propagation paths.

As discussed above, per the present disclosure, at issue is how many carriers a base station should aggregate together for carrier-aggregation service of a UE.

The base station could face this issue when the UE initially connects with the base station and/or after the UE has been connected with the base station for some time on a single carrier or with carrier aggregation. Further, as the disclosed process relates to the quantity of MIMO layers that could be supported, the base station could face this issue when application of MIMO would be useful or otherwise appropriate. For instance, the base station could face the issue when the base station is threshold heavily loaded with connected UEs and/or with air-interface traffic, in which case MIMO could help to increase air interface capacity.

The base station could detect one or more such trigger conditions and could responsively engage in the disclosed process to configure carrier-aggregation service for the UE. Alternatively or additionally, the base station could carry out the process periodically, such as each time the base station receives a new rank report from the UE. Further, the base station could apply a hysteresis timer to help avoid reconfiguring the quantity of carriers too often.

As explained above, the base station could decide on the quantity of carriers based on the MIMO rank reported by the UE, such as by selecting a higher quantity of carriers when the UE's reported rank is lower, and selecting a lower quantity of carriers when the UE's reported rank is higher. Further, the base station could decide on the quantity of carriers based on an evaluation of which quantity of carriers would result in use of a highest aggregate total of MIMO layers across the carriers of the selected quantity.

Figure 2:
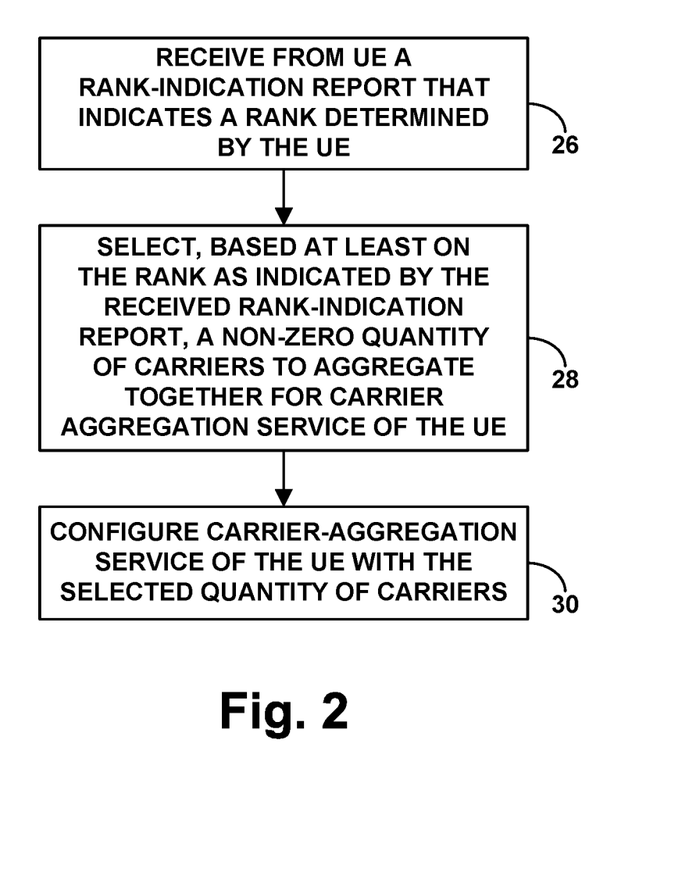
FIG. 2 is a flow chart depicting example operations in accordance with the disclosure.

FIG. 2 is a flow chart depicting an example method that could be carried out accordingly by a base station, to control how many carriers to aggregate together for carrier-aggregation service of a UE.

As shown in FIG. 2, at block 26, the method includes the base station receiving from the UE a rank-indication report that indicates a rank determined by the UE. In practice, the UE could periodically establish this rank based on the UE's evaluation of its RF communication with the base station and could indicate the rank as a rank-index value in its report to the base station. Further, the base station could have access to data that maps various ranks to corresponding maximum quantities of MIMO layers on which the base station can communicate with the UE (e.g., on each of the carriers that will be aggregated together for carrier-aggregation service). Thus, the base station could map the rank to a corresponding maximum quantity of supported MIMO layers for its communication with the UE.

At block 28, the base station could then select, based at least on the rank as indicated by the received rank-indication report, a non-zero quantity of carriers to aggregate together for carrier-aggregation service of the UE. And at block 30, the base station could then configure carrier-aggregation service of the UE with the selected quantity of carriers.

In line with the discussion above, the act of selecting the non-zero quantity of carriers to aggregate together for carrier-aggregation service of the UE could based on a mapping that makes the selected non-zero quantity of carriers inversely proportional to the indicated rank.

For example, there could a group of possible rank values ranging from a lower rank value to a higher rank value, and there could be a group of possible carrier-aggregation levels ranging from a lower carrier-aggregation level to a higher carrier-aggregation level. And the base station could be configured with reference data and/or program logic to map the lower rank value with the higher carrier-aggregation level and to map the higher rank value with the lower carrier-aggregation level.

Thus, the act of selecting the non-zero quantity of carriers based at least on the indicated rank could involve (i) making a determination of whether the indicated rank is the lower rank or rather the higher rank, (ii) if the determination is that the indicated rank is the lower rank, then, based on the determination, selecting as the non-zero quantity of carriers the higher quantity, and (iii) if the determination is that the indicated rank is the higher rank, then, based on the determination, selecting as the non-zero quantity of carriers the lower quantity.

By way of example, and without limitation, lower rank could be 2 or less, the higher rank could be greater than 2, the lower quantity of carriers could be 2, and the higher quantity of carriers could be 3. Thus, if the UE's reported rank is less than or equal to 2, then the base station could configure the UE with 3CA, and if the UE's reported rank is greater than 2, then the base station could configure the UE with 3CA.

As further discussed above, the base station could have access to capabilities data of the UE that specifies, respectively for each of multiple candidate quantities of carriers that could be aggregated together for carrier-aggregation service of the UE, a per-carrier maximum quantity of MIMO layers that the UE supports. And in that case, the act of selecting based on the indicated rank the non-zero quantity of carriers to aggregate together for carrier-aggregation service of the UE could be based on that UE capabilities data.

By way of example, the base station could identify, based on the indicated rank, a set of the candidate quantities of carriers based on determining that, for each candidate quantity in the set, the per-carrier maximum quantity of MIMO layers that the capabilities data specifies for the candidate quantity is no greater than the maximum quantity of MIMO layers with which the indicated rank corresponds. For instance, for each candidate quantity of carriers specified by the UE's capabilities data, (i) the base station could determine from the UE capabilities data the associated per-carrier maximum quantity of MIMO layers that could be supported, and (ii) the base station could include the candidate quantity in the set if that determined per-carrier maximum quantity of MIMO layers is not greater than the maximum quantity of MIMO layers with which the UE's reported rank corresponds.

As further discussed above, each candidate quantity in the identified set could be deemed to support service of the UE on a respective aggregate total number of MIMO layers, computed as a product of (i) the candidate quantity and (ii) the maximum quantity of MIMO layers that the capabilities data specifies for the candidate quantity.

The base station could thus select from the identified set of candidate quantities, as the non-zero quantity of carriers to aggregate together for carrier-aggregation service of the UE, one of the candidate quantities based on the selected candidate quantity having the greatest respective total number of MIMO layers among the candidate quantities in the set.

For example, the identified set of candidate quantities of carriers might include a first candidate quantity of carriers, where the first candidate quantity is 2, and where the UE capabilities data specifies for the first candidate quantity that the per-carrier maximum quantity of MIMO layers that the UE supports is 4, thus defining an aggregate total of 2×4=8 MIMO layers. And the identified set might further include a second candidate quantity of carriers, where the second candidate quantity is 3, and wherein the UE capabilities data specifies for the second candidate quantity that the per-carrier maximum quantity of MIMO layers that the UE supports is 2, thus defining an aggregate total of 3×2=6 MIMO layers.

In that case, the act of selecting the non-zero quantity of carriers could involve selecting the first candidate quantity of carriers based on the selected candidate quantity of carriers having a greater aggregate total number of MIMO layers than the second candidate quantity of carriers. Further, this could be the case even though the first candidate quantity of carriers is less than the second candidate quantity of carriers.

Additionally in line with the discussion above, the act of configuring the carrier-aggregation service of the UE with the selected quantity of carriers could involve (i) transmitting from the base station to the UE a configuration directive specifying each carrier of the selected quantity of carriers and (ii) recording by the base station in a context record for the UE a specification of each carrier of the selected quantity of carriers. For instance, the configuration directive could comprise an RRC configuration message, which could specify each carrier by a respective unique identifier.

Further, as discussed above, the base station could apply hysteresis to control switching of the selected quantity of carriers when the indicated rank changes, in an effort to avoid changing the quantity of carriers more often than desired.

Figure 3:
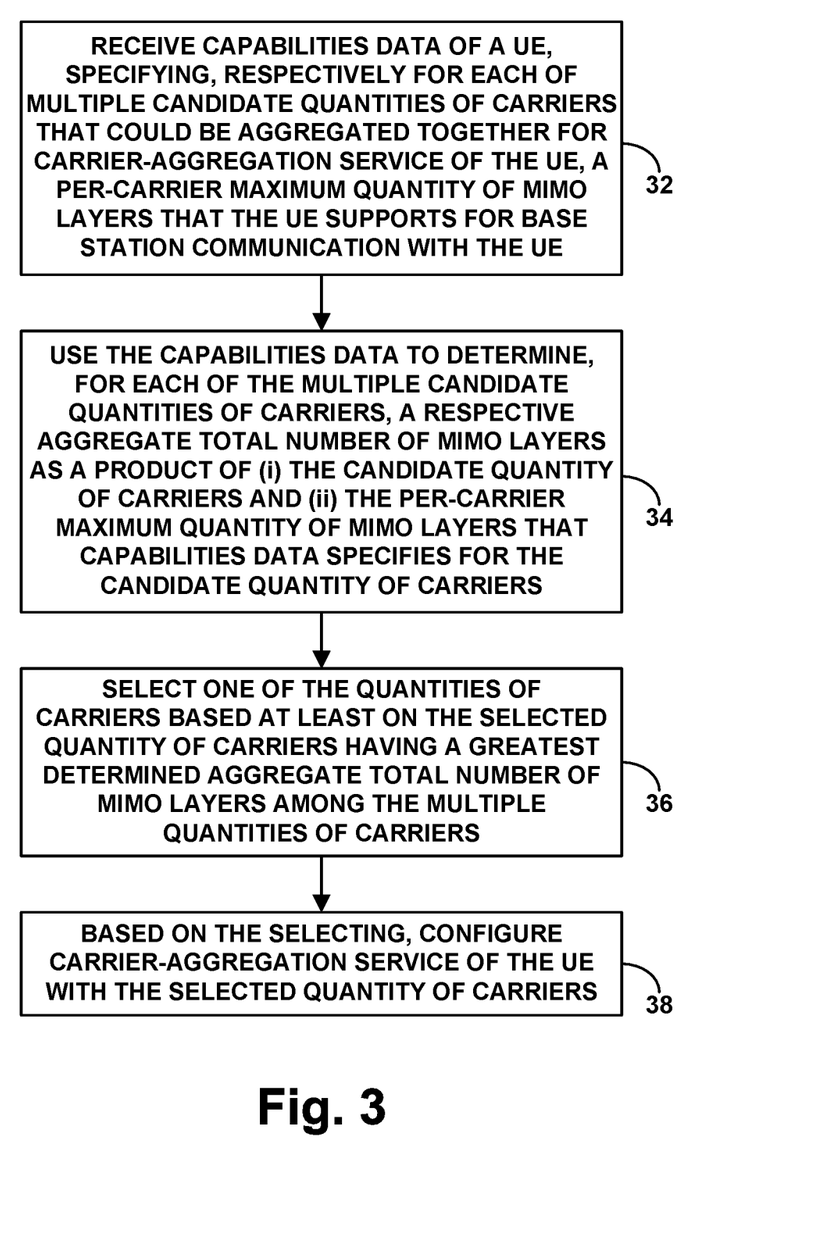
FIG. 3 is another flow chart depicting example operations in accordance with the disclosure.

FIG. 3 is next another flow chart depicting an example method that could be similarly carried out by a base station, to control how many carriers to aggregate together for carrier-aggregation service of a UE.

As shown in FIG. 3, at block 32, the base station receives capabilities data of the UE, the capabilities data specifying, respectively for each of multiple candidate quantities of carriers that could be aggregated together for carrier-aggregation service of the UE, a per-carrier maximum quantity of MIMO layers that the UE supports for base station communication with the UE. And at block 34, the base station uses the capabilities data to determine, for each of the multiple candidate quantities of carriers, a respective aggregate total number of MIMO layers as a product of (i) the candidate quantity of carriers and (ii) the per-carrier maximum quantity of MIMO layers that capabilities data specifies for the candidate quantity of carriers.

Further, at block 36, the base station selects one of the quantities of carriers based at least on the selected quantity of carriers having a greatest determined aggregate total number of MIMO layers among the multiple quantities of carriers. And at block 38, based on the selecting, the base station configures carrier-aggregation service of the UE with the selected quantity of carriers.

In an example implementation, for the multiple candidate quantities of carriers, the per-carrier maximum quantities of MIMO layers specified by the capabilities data could be inversely proportional to the respective quantities of carriers. For instance, the capabilities data could specify multiple quantities of carriers including a lower quantity and a higher quantity, and the capabilities data could specify for the lower quantity of carriers a first per-carrier maximum quantity of MIMO layers and for the higher quantity of carriers a second per-carrier maximum quantity of MIMO layers, where the first per-carrier maximum quantity of MIMO layers is higher than the second per-carrier maximum quantity of MIMO layers.

In addition, note that the method depicted by FIG. 3 could further involve consideration of a rank reported by the UE. As discussed above for instance, the rank could be used as a basis to limit the candidate quantities of carriers to those whose per-carrier maximum quantity of MIMO layers does not exceed the maximum quantity of MIMO layers corresponding with the UE's reported rank.

Further, various other features discussed above could apply in this context as well, and vice versa. For example, for 2CA, the UE may support up to 4 MIMO layers, for an aggregate total of 8 MIMO layers, and for 3CA, the UE may support up to 2 MIMO layers, for an aggregate total of 6 MIMO layers. So given a choice between those levels of carrier aggregation based on the UE supporting both possible levels, the base station could opt to configure 2CA, as that would result in use of a greater aggregate total of MIMO layers.

Figure 4:
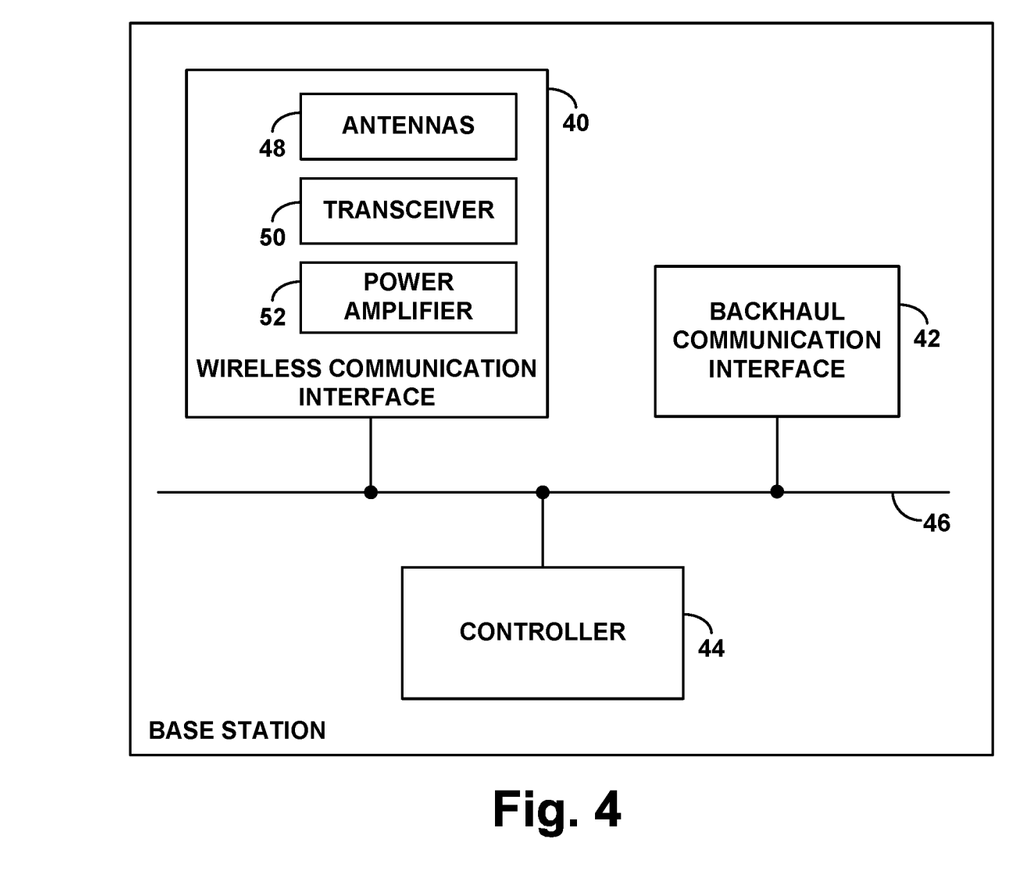
FIG. 4 is a simplified block diagram of an example base station operable in accordance with the disclosure.

Finally, FIG. 4 is a simplified block diagram of an example base station operable in line with the discussion above. As shown, the example base station includes a wireless communication interface 40, a backhaul communication interface 42, and a controller 44, which could be integrated or communicatively linked together by a system bus, network, or other connection mechanism 46.

The wireless communication interface 40 could include an antenna structure (e.g., a MIMO antenna array, possibly a massive-MIMO array) 48, a transceiver 50, and a power amplifier 52, among one or more other RF components, to cooperatively facilitate air interface communication with a UE served by the base station. And the backhaul communication interface 42 could include a wireless and/or wireless network communication module configured to support communication on a core access network such as that shown in FIG. 1 for instance.

The controller 44 could then be configured (e.g., with one or more processing units, non-transitory data storage, and program instructions stored in the data storage and executable by the one or more processing units) to carry out various operations described herein, to control how many carriers to aggregate together for carrier-aggregation service of the UE.

For example, the operations could include (i) receiving, from the UE, a rank-indication report indicating a rank determined by the UE, where the indicated rank corresponds with a maximum quantity of MIMO layers on which the base station can communicate with the UE on each of the carriers that will be aggregated together for carrier-aggregation service of the UE, (ii) selecting, based at least on the rank as indicated by the received rank-indication report, a non-zero quantity of carriers to aggregate together for carrier-aggregation service of the UE, and (iii) based on the selecting, causing the base station to configure carrier-aggregation service of the UE with the selected quantity of carriers.

Further, various features discussed above could be carried out in this context as well, and vice versa. For instance, the selecting of the non-zero quantity of carriers could be done such that the selected quantity is inversely proportional to the rank. And the selecting could involve identifying a set of candidate quantities of carriers based on consideration of aggregate total number of supported MIMO layers, and selecting the candidate quantity that has the highest aggregate total number of MIMO layers. Other examples are possible as well.

Exemplary embodiments have been described above. Those skilled in the art will understand, however, that changes and modifications may be made to these embodiments without departing from the true scope and spirit of the invention. Further, various features described above with respect to certain embodiments could be implemented in other embodiments described above as well.

We claim:

1. A method operable by a base station to control how many carriers to aggregate together for carrier-aggregation service of a user equipment device (UE), the method comprising:

receiving by the base station, from the UE, a rank-indication report indicating a rank determined by the UE, wherein the indicated rank corresponds with a maximum quantity of multiple-input-multiple-output (MIMO) layers on which the base station can communicate with the UE on each of the carriers that will be aggregated together for carrier-aggregation service of the UE;

selecting by the base station, based at least on the rank as indicated by the received rank-indication report, a non-zero quantity of carriers to aggregate together for carrier-aggregation service of the UE; and based on the selecting, configuring carrier-aggregation service of the UE with the selected quantity of carriers.

2. The method of claim 1, wherein selecting the non-zero quantity of carriers to aggregate together for carrier-aggregation service of the UE is based on a mapping that makes the selected non-zero quantity of carriers inversely proportional to the indicated rank.

3. The method of claim 1, wherein the indicated rank is from a group of ranks including a lower rank and a higher rank, wherein the non-zero quantity of carriers is from a group of quantities of carriers including a lower quantity and a higher quantity, and wherein selecting the non-zero quantity of carriers based at least on the indicated rank comprises:

making a determination of whether the indicated rank is the lower rank or rather the higher rank;

if the determination is that the indicated rank is the lower rank, then, based on the determination, selecting as the non-zero quantity of carriers the higher quantity; and if the determination is that the indicated rank is the higher rank, then, based on the determination, selecting as the non-zero quantity of carriers the lower quantity.

4. The method of claim 3, wherein the lower rank is 2 or less, wherein the higher rank is greater than 2, wherein the lower quantity is 2, and wherein the higher quantity is 3.

5. The method of claim 1, wherein the base station has access to capabilities data of the UE that specifies, respectively for each of multiple candidate quantities of carriers that could be aggregated together for carrier-aggregation service of the UE, a per-carrier maximum quantity of MIMO layers that the UE supports, and wherein selecting based on the indicated rank the non-zero quantity of carriers to aggregate together for carrier-aggregation service of the UE comprises:

identifying, based on the indicated rank, a set of the candidate quantities based on determining that, for each candidate quantity in the set, the per-carrier maximum quantity of MIMO layers that the capabilities data specifies for the candidate quantity is no greater than the maximum quantity of MIMO layers with which the indicated rank corresponds, wherein each candidate quantity in the set supports service of the UE on a respective aggregate total number of MIMO layers as a product of (i) the candidate quantity and (ii) the maximum quantity of MIMO layers that the capabilities data specifies for the candidate quantity; and selecting from the identified set of candidate quantities, as the non-zero quantity of carriers to aggregate together for carrier-aggregation service of the UE, one of the candidate quantities based on the selected candidate quantity having a greatest respective aggregate total number of MIMO layers among the candidate quantities in the set.

6. The method of claim 5, wherein the identified set of candidate quantities of carriers includes (i) a first candidate quantity of carriers, wherein the first candidate quantity is 2, and wherein the capabilities data specifies for the first candidate quantity that the per-carrier maximum quantity of MIMO layers that the UE supports is 4, thus defining an aggregate total of 2×4=8 MIMO layers, and (ii) a second candidate quantity of carriers, wherein the second candidate quantity is 3, and wherein the capabilities data specifies for the second candidate quantity that the per-carrier maximum quantity of MIMO layers that the UE supports is 2, thus defining an aggregate total of 3×2=6 MIMO layers, and wherein selecting the non-zero quantity of carriers comprises selecting the first candidate quantity of carriers based on the selected candidate quantity of carriers having a greater aggregate total number of MIMO layers than the second candidate quantity of carriers, even though the first candidate quantity of carriers is less than the second candidate quantity of carriers.

7. The method of claim 1, wherein configuring the carrier-aggregation service of the UE with the selected quantity of carriers comprises (i) transmitting from the base station to the UE a configuration directive specifying each carrier of the selected quantity of carriers and (ii) recording by the base station in a context record for the UE a specification of each carrier of the selected quantity of carriers.

8. The method of claim 7, wherein the configuration directive comprises a Radio Resource Control (RRC) configuration message.

9. The method of claim 1, further comprising applying hysteresis by the base station to control switching of the selected quantity of carriers when the indicated rank changes.

10. A method operable by a base station to control how many carriers to aggregate together for carrier-aggregation service of a user equipment device (UE), the method comprising:

receiving, by the base station, capabilities data of the UE, wherein the capabilities data specifies, respectively for each of multiple candidate quantities of carriers that could be aggregated together for carrier-aggregation service of the UE, a per-carrier maximum quantity of multiple-input-multiple-output (MIMO) layers that the UE supports for base station transmission to the UE;

using, by the base station, the capabilities data to determine, for each of the multiple candidate quantities of carriers, a respective aggregate total number of MIMO layers as a product of (i) the candidate quantity of carriers and (ii) the per-carrier maximum quantity of MIMO layers that capabilities data specifies for the candidate quantity of carriers;

selecting, by the base station, one of the quantities of carriers based at least on the selected quantity of carriers having a greatest determined aggregate total number of MIMO layers among the multiple quantities of carriers; and based on the selecting, configuring by the base station carrier-aggregation service of the UE with the selected quantity of carriers.

11. The method of claim 10, wherein, for the multiple candidate quantities of carriers, the per-carrier maximum quantities of MIMO layers specified by the capabilities data are inversely proportional to the respective quantities of carriers.

12. The method of claim 10, wherein the multiple candidate quantities of carriers includes (i) a first candidate quantity of carriers, wherein the first candidate quantity is 2, and wherein the capabilities data specifies for the first candidate quantity that the per-carrier maximum quantity of MIMO layers that the UE supports is 4, thus defining an aggregate total of 2×4=8 MIMO layers, and (ii) a second candidate quantity of carriers, wherein the second candidate quantity is 3, and wherein the capabilities data specifies for the second candidate quantity that the per-carrier maximum quantity of MIMO layers that the UE supports is 2, thus defining an aggregate total of 3×2=6 MIMO layers, and wherein selecting the quantity of carriers comprises selecting the first candidate quantity of carriers based on the selected candidate quantity having a greater aggregate total number of MIMO layers than the second candidate quantity of carriers, even though the first candidate quantity of carriers is less than the second candidate quantity of carriers.

13. The method of claim 10, wherein configuring the carrier-aggregation service of the UE with the selected quantity of carriers comprises (i) transmitting from the base station to the UE a configuration directive specifying the each carrier of the selected quantity of carriers and (ii) recording by the base station in a context record for the UE a specification of each carrier of the selected quantity of carriers.

14. The method of claim 13, wherein the configuration directive comprises a Radio Resource Control (RRC) configuration message.

15. A base station comprising:
- an antenna structure for engaging in air interface communication with a user equipment device (UE) served by the base station; and
- a controller, wherein the controller is configured to carry out operations to control how many carriers to aggregate together for carrier-aggregation service of the UE, the operations including:
  - receiving, from the UE, a rank-indication report indicating a rank determined by the UE, wherein the indicated rank corresponds with a maximum quantity of multiple-input-multiple-output (MIMO) layers on which the base station can communicate with the UE on each of the carriers that will be aggregated together for carrier-aggregation service of the UE,
  - selecting, based at least on the rank as indicated by the received rank-indication report, a non-zero quantity of carriers to aggregate together for carrier-aggregation service of the UE, and
  - based on the selecting, causing the base station to configure carrier-aggregation service of the UE with the selected quantity of carriers.

16. The base station of claim 15, wherein the indicated rank is from a group of ranks including a lower rank and a higher rank, wherein the non-zero quantity of carriers is from a group of quantities of carriers including a lower quantity and a higher quantity, and wherein selecting the non-zero quantity of carriers based at least on the indicated rank comprises:
- making a determination of whether the indicated rank is the lower rank or rather the higher rank;
- if the determination is that the indicated rank is the lower rank, then, based on the determination, selecting as the non-zero quantity of carriers the higher quantity; and
- if the determination is that the indicated rank is the higher rank, then, based on the determination, selecting as the non-zero quantity of carriers the lower quantity.

17. The base station of claim 16, wherein the lower rank is 2 or less, wherein the higher rank is greater than 2, wherein the lower quantity is 2, and wherein the higher quantity is 3.

18. The base station of claim 15, wherein the base station has access to capabilities data of the UE that specifies, respectively for each of multiple candidate quantities of carriers that could be aggregated together for carrier-aggregation service of the UE, a per-carrier maximum quantity of MIMO layers that the UE supports, and wherein selecting based on the indicated rank the non-zero quantity of carriers to aggregate together for carrier-aggregation service of the UE comprises:
- identifying, based on the indicated rank, a set of the candidate quantities based on determining that, for each candidate quantity in the set, that the per-carrier maximum quantity of MIMO layers that the capabilities data specifies for the candidate quantity is no greater than the maximum quantity of MIMO layers with which the indicated rank corresponds, wherein each candidate quantity in the set supports service of the UE on a respective aggregate total number of MIMO layers as a product of (i) the candidate quantity and (ii) the maximum quantity of MIMO layers that the capabilities data specifies for the candidate quantity; and
- selecting from the identified set of candidate quantities, as the non-zero quantity of carriers to aggregate together for carrier-aggregation service of the UE, one of the candidate quantities based on the selected candidate quantity having a greatest respective aggregate total number of MIMO layers among the candidate quantities in the set.

19. The base station of claim 18,
- wherein the identified set of candidate quantities of carriers includes (i) a first candidate quantity of carriers, wherein the first candidate quantity is 2, and wherein the capabilities data specifies for the first candidate quantity that the per-carrier maximum quantity of MIMO layers that the UE supports is 4, thus defining an aggregate total of 2×4=8 MIMO layers, and (ii) a second candidate quantity of carriers, wherein the second candidate quantity is 3, and wherein the capabilities data specifies for the second candidate quantity that the per-carrier maximum quantity of MIMO layers that the UE supports is 2, thus defining an aggregate total of 3×2=6 MIMO layers, and
- wherein selecting the non-zero quantity of carriers comprises selecting the first candidate quantity of carriers based on the selected candidate quantity of carriers having a greater aggregate total number of MIMO layers than the second candidate quantity of carriers, even though the first candidate quantity of carriers is less than the second candidate quantity of carriers.

20. The base station of claim 15, wherein configuring the carrier-aggregation service of the UE with the selected quantity of carriers comprises (i) transmitting to the UE a configuration directive specifying the each carrier of the selected quantity of carriers and (ii) recording in a context record for the UE a specification of each carrier of the selected quantity of carriers.

* * * * *